(12) United States Patent
Maryfield et al.

(10) Patent No.: US 7,859,675 B2
(45) Date of Patent: Dec. 28, 2010

(54) FIELD TEST OF A RETRO-REFLECTOR AND DETECTOR ASSEMBLY

(75) Inventors: Tony Maryfield, Poway, CA (US); Mahyar Dadkhah, San Diego, CA (US)

(73) Assignee: Cubic Corporation, San Diego, CA (US)

( * ) Notice: Subject to any disclaimer, the term of this patent is extended or adjusted under 35 U.S.C. 154(b) by 285 days.

(21) Appl. No.: 12/266,072

(22) Filed: Nov. 6, 2008

(65) Prior Publication Data

US 2009/0116025 A1 May 7, 2009

Related U.S. Application Data

(60) Provisional application No. 60/985,960, filed on Nov. 6, 2007.

(51) Int. Cl.
G01N 21/55 (2006.01)
(52) U.S. Cl. .................................................... 356/445
(58) Field of Classification Search ......... 356/445–448, 356/450–458
See application file for complete search history.

(56) References Cited

U.S. PATENT DOCUMENTS

| | | | |
|---|---|---|---|
| 4,097,141 A | 6/1978 | Warner | |
| 4,143,263 A | 3/1979 | Eichweber | |
| 4,777,660 A | 10/1988 | Gould et al. | |
| 4,837,575 A | 6/1989 | Conner, Jr. | |
| 4,866,781 A | 9/1989 | Borken et al. | |
| 4,937,795 A | 6/1990 | Motegi et al. | |
| 4,983,021 A | 1/1991 | Fergason | |
| 5,015,096 A | 5/1991 | Kowalski et al. | |
| 5,083,866 A | 1/1992 | Dey | |
| 5,084,628 A * | 1/1992 | Burge et al. ............ | 250/559.42 |

(Continued)

FOREIGN PATENT DOCUMENTS

EP 1536401 A 6/2005

(Continued)

OTHER PUBLICATIONS

U.S. Appl. No. 11/140,473, filed May 27, 2005, Varshneya, et al.

(Continued)

*Primary Examiner*—Gregory J Toatley
*Assistant Examiner*—Jarreas C Underwood
(74) *Attorney, Agent, or Firm*—Townsend and Townsend and Crew LLP

(57) ABSTRACT

An opto-electronic assembly and testing method are disclosed. A housing of the opto-electronic assembly is coupled to a window to form an optical chamber. A retro-reflector can be coupled to the housing. A radiation source can be disposed on or about the retro-reflector. The radiation source can emit radiation into the optical chamber through at least a portion of the retro-reflector. A detector can sense a level of the radiation in the optical chamber. A controller coupled to the detector can signal an error condition when the level of the radiation exceeds a threshold associated with the presence of obscurants on the window. Optionally, the controller can be coupled to the radiation source for selectively emitting pulses of radiation into the optical chamber and detecting data bits corresponding to the pulses of radiation.

27 Claims, 7 Drawing Sheets

U.S. PATENT DOCUMENTS

| | | | |
|---|---|---|---|
| 5,117,305 A | 5/1992 | Dey |
| 5,121,242 A | 6/1992 | Kennedy |
| 5,136,602 A | 8/1992 | Sugawara |
| 5,144,397 A | 9/1992 | Tokuda et al. |
| 5,173,643 A | 12/1992 | Sullivan et al. |
| 5,274,379 A | 12/1993 | Carbonneau et al. |
| 5,299,227 A | 3/1994 | Rose |
| 5,306,925 A | 4/1994 | Abe et al. |
| 5,426,295 A | 6/1995 | Parikh et al. |
| 5,448,045 A | 9/1995 | Clark |
| 5,448,847 A | 9/1995 | Teetzel |
| 5,459,470 A | 10/1995 | Wootton et al. |
| 5,476,385 A | 12/1995 | Parikh et al. |
| 5,539,565 A | 7/1996 | Waddoups et al. |
| 5,589,981 A | 12/1996 | Kasser et al. |
| 5,648,862 A | 7/1997 | Owen |
| 5,668,386 A | 9/1997 | Makiuchi et al. |
| 5,686,722 A | 11/1997 | Dubois et al. |
| 5,819,164 A | 10/1998 | Sun et al. |
| 5,822,430 A | 10/1998 | Doud |
| 5,870,215 A | 2/1999 | Milano et al. |
| 5,966,226 A | 10/1999 | Gerber |
| 5,966,227 A | 10/1999 | Dubois et al. |
| 6,005,276 A | 12/1999 | Forrest et al. |
| 6,055,087 A | 4/2000 | Kwon et al. |
| 6,154,299 A | 11/2000 | Gilbreath et al. |
| 6,229,165 B1 | 5/2001 | Sakai et al. |
| 6,493,123 B1 | 12/2002 | Mansell et al. |
| 6,518,572 B1 | 2/2003 | Kishii et al. |
| 6,545,805 B2 | 4/2003 | He et al. |
| 6,646,292 B2 | 11/2003 | Steigerwald et al. |
| 6,736,518 B1 | 5/2004 | Belt et al. |
| 6,836,351 B2 | 12/2004 | Livingston et al. |
| 7,213,942 B2 | 5/2007 | Jiang et al. |
| 7,308,202 B2 | 12/2007 | Roes et al. |
| 7,333,735 B1 | 2/2008 | Goorjian |
| 7,388,654 B2 * | 6/2008 | Raab et al. | 356/4.01 |
| 7,602,485 B2 * | 10/2009 | Mori | 356/239.2 |
| 2001/0013967 A1 | 8/2001 | Tsumura |
| 2001/0035723 A1 | 11/2001 | Pelrine et al. |
| 2001/0035995 A1 | 11/2001 | Ruggiero |
| 2003/0048533 A1 | 3/2003 | Lyons, III |
| 2003/0147651 A1 | 8/2003 | Roes et al. |
| 2003/0227681 A1 | 12/2003 | Currie |
| 2004/0075880 A1 | 4/2004 | Pepper et al. |
| 2006/0054899 A1 | 3/2006 | Takahashi et al. |
| 2006/0180830 A1 | 8/2006 | Kambiz et al. |
| 2007/0127928 A1 | 6/2007 | Varshneya et al. |
| 2008/0217602 A1 | 9/2008 | Kahen |

FOREIGN PATENT DOCUMENTS

| | | |
|---|---|---|
| GB | 2366872 A | 3/2000 |
| JP | 4263475 A | 9/1992 |
| JP | 2000/299489 A | 10/2000 |
| WO | WO 99/57789 A | 11/1999 |
| WO | WO 03075493 A | 9/2003 |

OTHER PUBLICATIONS

U.S. Appl. No. 12/171,803, filed Jul. 11, 2008, Dadkhah, et al.
U.S. Appl. No. 12/171,837, filed Jul. 11, 2008, Dadkhah, et al.
PCT International Search Report mailed Dec. 30, 2009; International Application No. PCT/US2008/081618; 5 pages.
U.S. Appl. No. 11/295,846, filed Dec. 7, 2005, Varshneya et al.
Hong, Y.K., et al. "Corner Cube Reflectors by Surface Tension Self-Assembly", Imperial College London; UC Berkeley, [undated], 2 pgs.
Hong, Y.K., et al. Design, fabrication and test of self-assembled optical corner cube reflector, *J. Micromech. Microeng.* (2005) 15:663-672.
Office Action dated Dec. 16, 2005 in U.S. Appl. No. 11/140,473, 6 pgs.
Office Action dated Dec. 29, 2008 in U.S. Appl. No. 11/295,849, 13 pgs.
Office Action dated Apr. 16, 2008 in U.S. Appl. No. 11/295,849, 12 pgs.
Office Action dated Jul. 1, 2009 in U.S. Appl. No. 11/295,849, 10 pgs.
Office Action dated May 29, 2009 in U.S. Appl. No. 12/171,803, 8 pgs.
PCT International Search Report and Written Opinion mailed Feb. 13, 2009; International Application No. PCT/US2008/069875, 21 pages.
PCT International Search Report and Written Opinion mailed Nov. 13, 2008, Application No. PCT/US2008/069888, 14 pages.
PCT International Search Report and Written Opinion mailed Oct. 10, 2008, Application No. PCT/US2008/069874, 15 pages.
Rabinovich, .W.S., et al. "Cat's eye modulating retro-reflectors for free-space optical data transfer", [undated], 10 pgs.
Rabinovich, .W.S., et al. Free-Space Optical Link with Low Alignment Sensitivity using the 1553 Protocol, [undated], 8 pgs.
Rabinovich, .W.S., et al. "InGaAs Multiple Quantum Well Modulating Retro-reflector for Free Space Optical Communications", US Naval Research Laboratory, Washington, D.C. 20375 [undated], 12 pgs.
Rarity, J.G., et al. "Ground to satellite secure key exchange using quantum cryptography", *New Journal of Physics* (2002) 4:82.1-82.21.

\* cited by examiner

FIELD TEST OF A RETRO-REFLECTOR AND DETECTOR ASSEMBLY

CROSS-REFERENCES TO RELATED APPLICATIONS

This application claims the benefit of and is a non-provisional of U.S. Provisional Application 60/985,960 filed on Nov. 6, 2007, which is assigned to the assignee hereof and incorporated herein by reference for all purposes.

BACKGROUND

In combat identification systems, an optical transceiver can employ modulators and/or reflectors to respond to an interrogating beam of light. The modulators control the incoming beam and the reflectors direct it back toward the source. By re-modulating the interrogating beam of light, the holder of the optical transceiver can be identified in a battlefield environment or as part of a combat training exercise.

BRIEF SUMMARY OF EMBODIMENTS

An opto-electronic assembly and testing method are disclosed. A housing of the opto-electronic assembly is coupled to a window to form an optical chamber. A retro-reflector can be coupled to the housing. A radiation source can be disposed on or about the retro-reflector. The radiation source can emit radiation into the optical chamber through at least a portion of the retro-reflector. A detector can sense a level of the radiation in the optical chamber. A controller coupled to the detector can signal an error condition when the level of the radiation exceeds a threshold associated with the presence of obscurants on the window. Optionally, the controller can be coupled to the radiation source for selectively emitting pulses of radiation into the optical chamber and detecting data bits corresponding to the pulses of radiation.

In one embodiment, an opto-electronic assembly is disclosed. The assembly includes a housing comprising an optical chamber. A window is coupled to the housing for passing radiation between an inside of the housing and an outside of the housing. A retro-reflector is also coupled to housing. A radiation source can be coupled to the retro-reflector for emitting radiation into the optical chamber through at least a part of the retro-reflector. A detector can sense a level of the emitted radiation within the optical chamber. A controller can be coupled to the detector for determining a first error condition when the level of the emitted radiation exceeds a first threshold. The controller can also be coupled to the radiation source for generating pulses of the emitted radiation corresponding to a predetermined sequence of data bits. The controller can detect a data bit when the level of the emitted radiation exceeds a second threshold and can detect a second error condition based on a difference between the detected data bits and the predetermined sequence of data bits.

In another embodiment, the opto-electronic assembly includes a quantum well modulator coupled to the controller and disposed between the radiation source and the window. The controller can be configured to modulate the emitted radiation by changing an optical property of the quantum well modulator in accordance with a predetermined modulation sequence. The controller can also be configured to detect the second error condition based on a difference between the detected data bits and the modulated sequence of emitted radiation.

In one embodiment, a method of testing an opto-electronic assembly is disclosed. The method includes emitting radiation through at least part of a retro-reflector and sensing the radiation with a detector. The method also includes determining if a window coupled to the radiation is at least partly occluded based on a level of the radiation at the detector. The method can include generating pulses of radiation according to a predetermined sequence of data bits. At the detector, a data bit can be detected when the level of the radiation exceeds a first threshold value. The method can include determining if the detector can properly recognize the radiation. This can involve comparing the detected bits with the predetermined sequence of data bits. Also, the method can include determining that the window is at least partly occluded when the level of the radiation exceeds a second threshold value.

In one embodiment, an opto-electronic assembly is disclosed. The assembly includes a housing that defines an optical cavity. A window is coupled to the housing and a substrate can be disposed within the housing opposite to the window. A retro-reflector can be coupled to the substrate and can include one or more radiation sources for emitting radiation through at least part of the retro-reflector. A quantum well modulator can be coupled to the retro-reflector for modulating the emitted radiation according to a predetermined sequence. At least one detector can be coupled to the substrate for detecting emitted radiation within the optical cavity. A processor can be coupled to the at least one detector for determining an occlusion of the window based on a level of the detected radiation. The processor can detect a bit if the level of the emitted radiation exceeds a first threshold value and can detect a bit error based on the detected bits and the predetermined sequence.

DETAILED DESCRIPTION OF EMBODIMENTS

The ensuing description provides preferred exemplary embodiment(s) only, and is not intended to limit the scope or applicability of the disclosure. Rather, the ensuing description of preferred embodiment(s) will provide those skilled in the art with an enabling description for implementing the preferred exemplary embodiment(s). It is understood that various changes may be made in the function and arrangement of the elements without departing from the spirit and scope as set forth in the appended claims.

Figure 1:
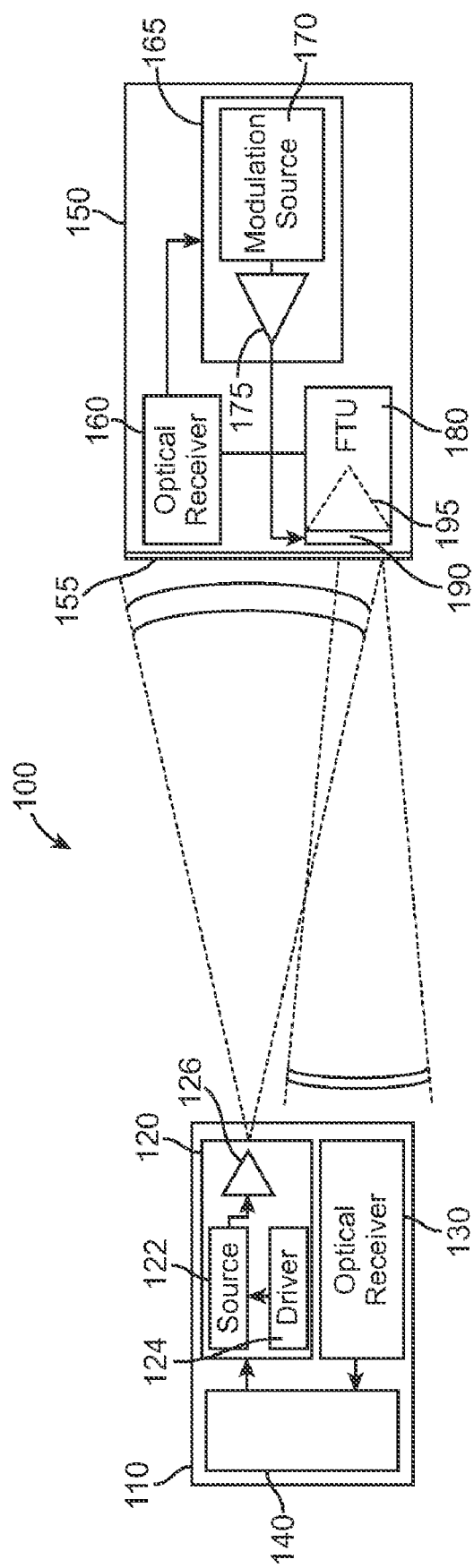
FIG. 1 is a block diagram of a communication system according to embodiments of the present invention.

FIG. 1 is a block diagram of a free space communication system 100 according to embodiments of the present invention. Communication system 100 can include a first transceiver 110 that is configured to generate a modulated optical signal. The modulated optical signal can be transmitted to a second transceiver 150, for example, via a free space communication channel. The second transceiver 150 can be configured to receive the modulated optical signal and to return a coded response signal. As used herein, "optical" refers to signals used with free space communication system 100 regardless of whether they are visible to the human eye. In particular, it is contemplated that optical signals used with embodiments of the present invention can have wavelengths in the infrared spectrum. For example, the optical signal can have wavelengths ranging from approximately 700 nm to approximately 1.5 mm, or other wavelengths can be used.

First transceiver 110 can include an optical transmitter 120 for generating an outgoing optical signal and an optical receiver 130 configured to receive a retro-modulated optical signal, or some other received optical signal. The optical transmitter 120 can include an optical source 122 such as a laser. For example, an infrared laser can be used as the optical source. The output of optical source 122 can be controlled by a driver 124 which can, for example, modulate the optical signal by modulating the laser drive current.

In some embodiments, driver 124 is configured to pulse the current to the optical source 122 to create a pulsed optical output signal. Driver 124 can control the timing and duration of the pulses according to a data source, such as a data and control module 140. The optical signal can be coupled from optical source 122 to an optical amplifier 126 that amplifies the modulated optical signal before it is coupled to the communication channel.

Second transceiver 150 can be configured to receive the modulated optical signal over the communication channel. As illustrated, second transceiver 150 includes a window 155 that is configured to pass the incoming optical signal into a housing. Optical receiver 160 can be coupled to window 155 for receiving the modulated optical signal and can convert the modulated optical signal into an electrical signal. The electrical signal can represent the modulation data from first transceiver 110.

Optical receiver 160 can be coupled to modulation controller 165. Modulation controller 165 can determine, for example, if at least a portion of the modulation data corresponds to a predetermined signal or sequence. If it is determined that the modulation data corresponds to the predetermined signal or sequence, modulation source 170 can output a data signal to driver 175. Driver 175 can be coupled to retro-modulator 180 for controlling retro-modulation of the incoming optical signal based on the data signal.

Retro-modulator 180 can include a quantum well modulator 190 and a retro-reflector 195. Quantum well modulator 190 can be coupled to a front surface of retro-reflector 195 and configured as an optical switch. Based on the output of driver 175, quantum well modulator 190 can allow the incoming optical signal to pass into retro-reflector 195 and to be reflected back toward first transceiver 110. Alternatively, it can attenuate the incoming optical signal. By varying the output of driver 175 according to the data signal, an on-off keying of the incoming optical signal can be performed. In this way, the incoming optical signal can be retro-modulated without requiring a separate optical transmitter.

Retro-reflector 195 can be a corner cube reflector or like element configured to reflect the incoming optical signal away from second transceiver 150 along the direction of the incident optical signal. Retro-reflector can have a pyramidal shape with three or more internal reflective surfaces and a front entrance base. The reflective surfaces can be joined at the apex of the pyramid. The base may have different shapes, for example a triangle, a square, a hexagon, a circle.

Second transceiver 150 can be embodied as an optical tag such as those used with combat identification (CID) systems. Optical tags are typically portable devices which can be carried, worn on a garment, or attached to a vehicle for retro-reflecting optical signals as a means of communication. For example, an optical tag can detect a challenge code as part of an incoming optical signal and can retro-modulate the incoming signal with an appropriate response code. In this way, a person or object can be identified as friendly (or unknown) in a battlefield environment or as part of a combat training exercise.

In some embodiments, retro-modulator 180 includes a self-test capability for detecting various error conditions. For example, mud and debris may accumulate on window 155 during field use. Fingerprints and other marks may obstruct window 155 and affect the ability of second transceiver 150 to receive incoming optical signals. In addition, the opto-electrical components of second transceiver 150 may become damaged so that second transceiver 150 can no longer properly detect and retro-modulate the incoming signal. In battlefield conditions, these failures can have serious consequences.

In one embodiment, retro-modulator 180 includes one or more radiation sources (FTU) coupled to retro-reflector 195 and arranged to emit radiation into an optical chamber of second transceiver 150. The radiation sources can be arranged so that the emitted radiation passes through at least part of retro-reflector 195 and quantum well modulator 190 before entering the optical chamber. The emitted radiation can be reflected by window 155 and then detected at optical receiver 160. Based on a level of the detected radiation, second transceiver 150 can determine if window 155 is occluded and can signal an error condition.

Retro-modulator 180 can also simulate an incoming message. For example, in a self-test mode, retro-modulator 180 can generate a test message by varying the intensity of the radiation sources according to a predetermined sequence or pattern. Optical receiver 160 can detect the signal from the radiation sources and modulation controller 165 can decode the message. If the decoded message matches the test message, it can be determined that second transceiver 150 is functioning properly. If the decoded message does not match the test message, such as when bit errors are present in the decoded signal, then second transceiver 150 can signal an error condition. In this way, it is possible to thoroughly field test the operation of second transceiver 150.

Figure 2:
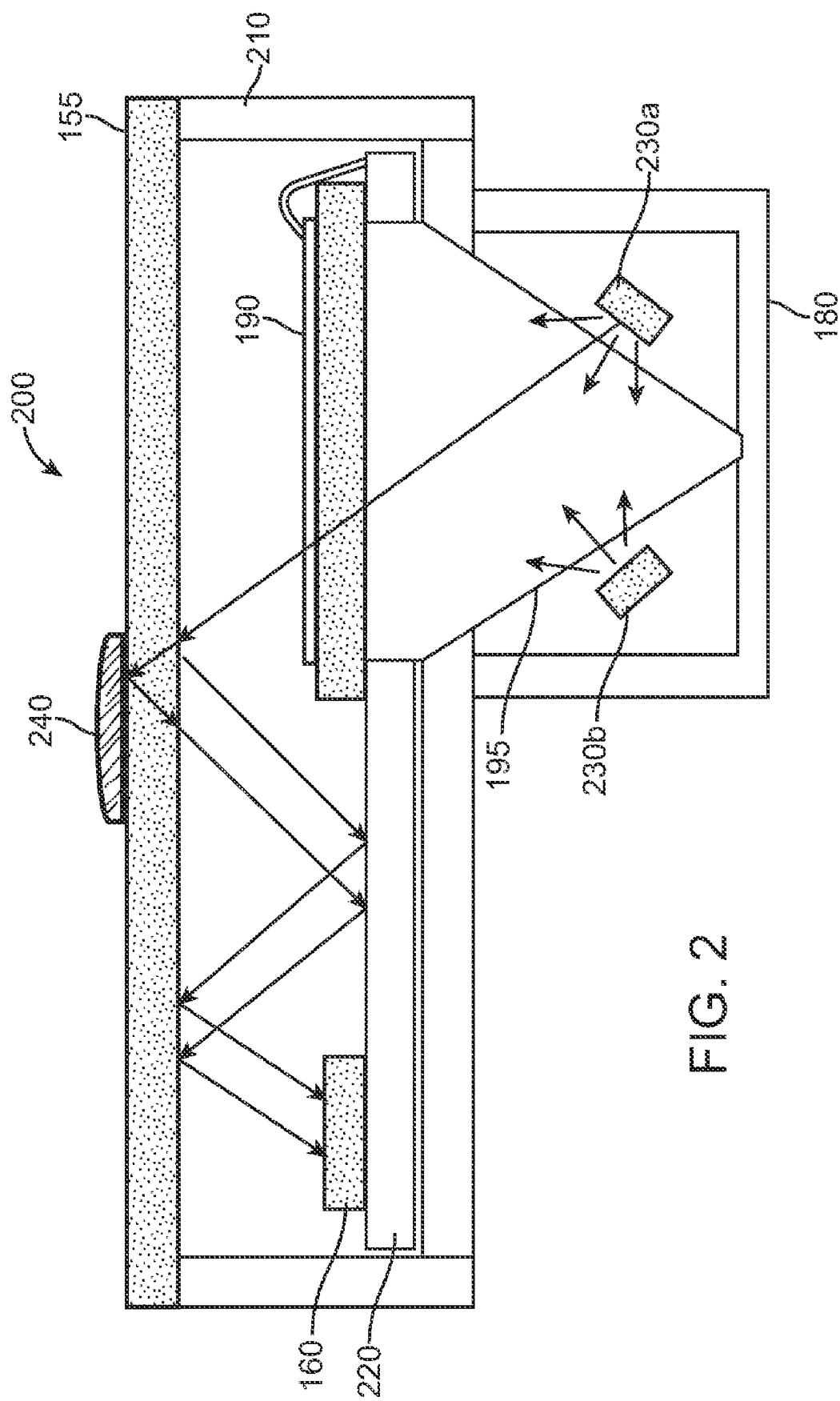
FIG. 2 is a cross-sectional view of an opto-electronic assembly according to various embodiments of the present invention.

FIG. 2 is a cross-sectional view of an opto-electronic assembly 200 according to one embodiment of the present invention. Opto-electronic assembly 200, for example, can be used with second transceiver 150. As shown, window 155 is coupled to housing 210. Window 155 can include glass, plastic or other materials that pass radiation at wavelengths used for communication. In some embodiments, window 155 is coupled with a wavelength selective filter. For example, window 155 may be configured to pass radiation at infrared wavelengths while filtering other wavelengths to limit the effect of solar loading on device electronics.

A substrate 220 is disposed within housing 210 opposite to window 155. Substrate 220 can be made from aluminum, metalized plastic, or reflective material. Alternatively, substrate 220 can have a reflective surface coating. As illustrated, housing 210 defines an optical chamber of opto-electronic assembly 200. In normal operation, external radiation enters the optical chamber through window 155. During self-testing, radiation can be emitted from within opto-electronic assembly 200 can be disbursed into the optical chamber. The emitted radiation and can pass through and/or be reflected by window 155.

Optical receiver 160 can be coupled to substrate 220 and arranged so as to detect radiation within the optical chamber. Optical receiver 160 can include one or more photodiodes such as silicon (Si), germanium (Ge), indium gallium arsenide (InGaAs), or like photo detectors that are sensitive to wavelengths of interest. For example, optical receiver 160 can be configured to detect an infrared communication signal and to generate a corresponding electrical signal.

As shown, quantum well modulator 190 is also coupled to substrate 220. Quantum well modulator 190 can be configured to perform optical switching based on electroabsorption. The electroabsorption effect operates on very small time scales, for example, on the order of picoseconds or less. When an electric field is applied across an active region of quantum well modulator 190, absorption for photon energies increases just below the band gap by the Stark effect. As the electric field is increased further, the band edge shifts to lower photon energies. By controlling the electric field, the optical properties of quantum well modulator 190 can be rapidly changed.

Retro-modulator 180 is coupled to housing 210 and optically coupled to quantum well modulator 190. Radiation sources 230 can include light emitting diodes or like devices which emit radiation. In one embodiment, a group of light emitting diodes is configured to emit radiation at a same wavelength as the incoming communication signal. The group can be arranged so that at least a portion of the emitted radiation passes along an optical path from corner cube reflector 195, through quantum well modulator 190, and into the optical chamber. Although two radiation sources 230 are shown, additional radiation sources may be used to achieve a desired amount and pattern of emitted radiation.

Opto-electronic assembly 200 can be configured to test whether window 155 is occluded. Mud 240 and debris can, in some cases, accumulate on window 155 and prevent proper functioning of the opto-electronic assembly. For example, mud 240 can block incoming radiation so that it is not detected properly by optical receiver 160. Mud 240 can also block the path of the retro-modulated signal from quantum well modulator 190 thereby disrupting return communications.

In one embodiment, radiation sources 230 emit pulses of light. The pulses can correspond to a predetermined sequence of data bits such as the challenge code of a combat identification system. The pulses can pass through retro-reflector 195 and quantum well modulator 190 into the optical chamber. As illustrated by arrows, a portion of the emitted radiation can be reflected from an inner surface of window 155 along an optical path terminating at optical receiver 160. Other radiation passing through window 155 can be reflected by mud 240 back to optical receiver 160, or it can exit from the opto-electronic assembly.

Experiments conducted by the inventors of the present application have demonstrated that radiation reflected by mud 240 or a similar obscurant of window 155 can be detected as having a higher intensity than radiation reflected when an obscurant is not present. In some cases, the intensity of the radiation reflected by mud 240 can be more than 8 dB higher than radiation reflected from a "clean" window. In some embodiments, optical receiver 160 is configured to detect the intensity of the reflected radiation and a field test circuit determines if an obscurant is present based on a level of the radiation.

Figure 3:
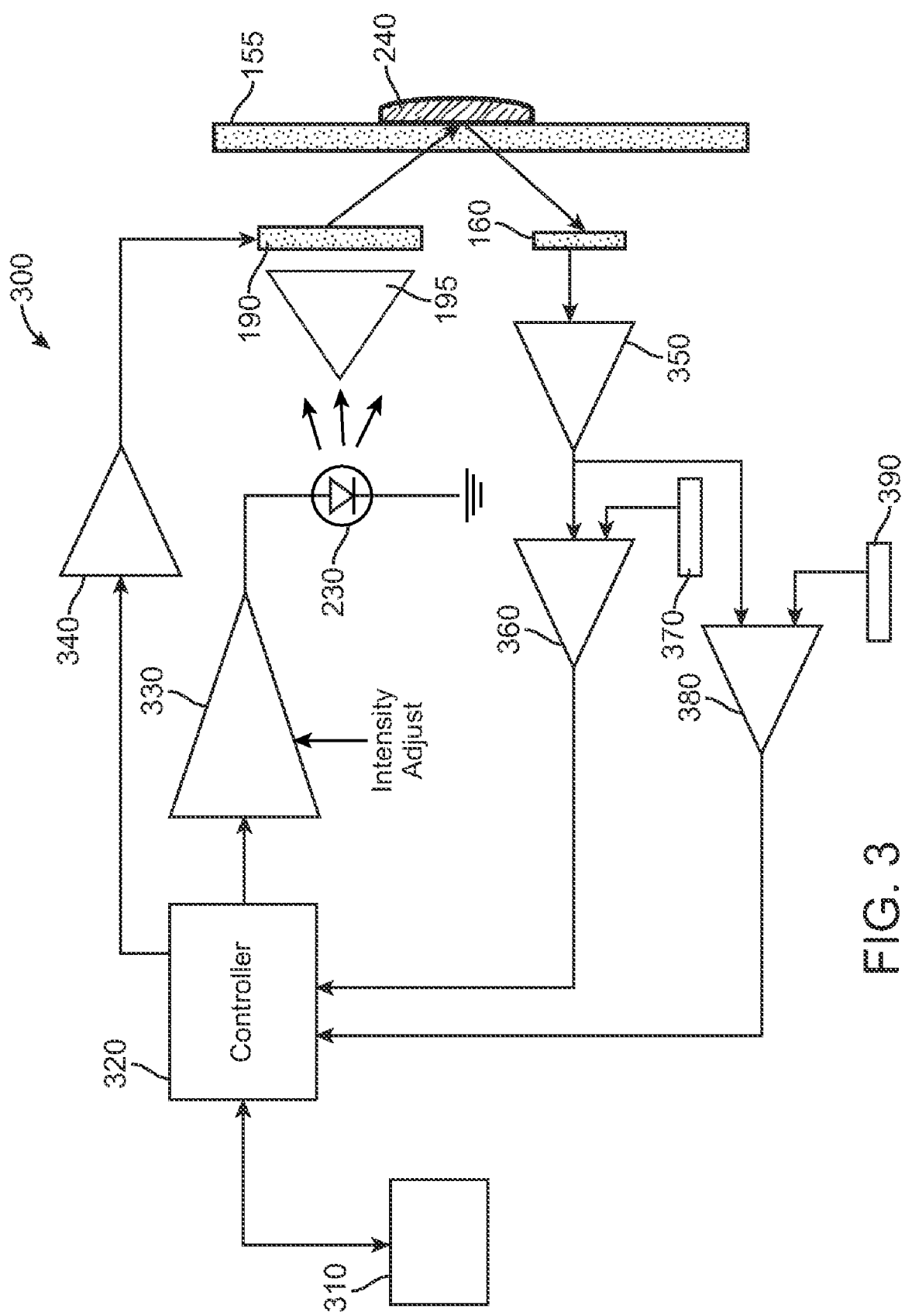
FIG. 3 is a functional block diagram of a field test circuit according to one embodiment of the present invention.

FIG. 3 is a functional block diagram of a field test circuit according to one embodiment of the present invention. Field test circuit 300 can be disposed within opto-electronic assembly 200 and can be used with an optical transceiver such as optical transceiver 150. As described herein, field test circuit 300 can test whether window 155 is obstructed and can also test the ability of an optical transceiver to receive and process an incoming communication signal. These tests can be performed separately or in combination as may be directed by a user interface. Also, field test circuit 300 can be configured to perform the tests periodically, on demand, or both. For example, field test circuit 300 can be configured to perform a bit-error test and an obscurant test when the optical transceiver is energized and thereafter as requested by a user of the device.

Controller 320 coordinates field testing of the optical transceiver. Controller 320 can include a microprocessor, a microcontroller, a field-programmable gate array (FPGA), an application-specific integrated circuit (ASIC), or like processing element. As shown, controller 320 is coupled to user-interface 310. User interface 310 supports input/output operations. For example, user interface 310 can include one or more switches or buttons for receiving input from a user such as selection of a particular field test operation. A status indicator can also be included as part of user interface 310. The status indicator can provide an audible or visual indication for alerting a user of the optical transceiver to an error condition.

Controller 320 is coupled to driver 330. Driver 330 is coupled to radiation source 230 and includes circuitry for controlling its operation. For example, driver 330 can determine a timing and intensity of the radiation emitted by radiation source 230. As shown, radiation source 230 includes one or more light emitting diodes arranged so that the radiation they emit is coupled to quantum well modulator 190. Driver 330 can be configured to pulse the LEDs according to a pattern determined by controller 320. The pattern can be a simple sequence of equally spaced pulses, or it can represent a specific bit sequence.

Controller 320 is also coupled to QWM driver 340. QWM driver 340 is configured to supply a modulating voltage used to control operation of the quantum well modulator 190. For example, in one embodiment, QWM driver 340 delivers a modulating voltage to quantum well modulator 190 sufficient to modulate an intensity of the emitted radiation by approximately 3 dB. QWM driver 340 can selectively apply the modulating voltage in response to signals from controller 320 to perform an on-off keying of the emitted radiation similar to that performed by the optical transceiver when retro-modulating an incoming communication signal. In this way, controller 320 can generate pulses of radiation and can modulate their passage into the optical chamber.

Optical receiver 160 can detect a level of the emitted radiation within the optical chamber. In some embodiments, optical receiver 160 includes a photodiode that outputs an electrical signal representative of the intensity of incident radiation. Amplifier 350 can adjust a level of the electrical signal and deliver a detection signal to comparators 360, 380.

A first comparator 360 can be configured to receive the detection signal at a first input and a bit threshold 370 at a second input. The bit threshold can represent a level of the detection signal below which no bit is considered to be detected. The bit threshold signal can be set during calibration of the field test circuit 300, or it can be determined based on operating parameters. For example, the bit threshold value 370 can be determined in relation to the intensity setting of driver 330 and/or the modulation depth of the quantum well modulator.

A second comparator 380 can be configured in a manner that is similar to first comparator 360. As shown, second comparator 380 receives the detection signal at a first input and an obscurant threshold 390 at a second input. The obscurant threshold 390 can represent a level of the detection signal associated with the presence of an obscurant on window 155. For example, the intensity of emitted radiation that is reflected by mud 240 can be on the order of 8-10 dB higher than the intensity of radiation reflected from an unobscured window.

Controller 320 can be configured to receive the output of first comparator 360 and second comparator 380 and to determine whether the optical transceiver is functioning properly. If a bit error test is performed, controller 320 can determine whether a bit is indicated by first comparator 360 for each pulse of the predetermined drive sequence. For example, if a pulse is generated but the detection signal does not exceed the bit threshold 370, the missing bit can indicate an error condition. Alternatively, if a bit is detected at a time when no pulse is generated or when a pulse is attenuated by quantum well modulator 190, the extra bit can also signify an error condition. Similarly, when the level of the detected radiation exceeds obscurant threshold 390, an obscuration error can be indicated.

Controller 320 can update user interface 310 with information about the error condition. In one embodiment, controller 320 illuminates a green LED to signify that the optical transceiver is functioning properly or a red LED to indicate an error condition is detected. Additional status indicators can be used to signal the type of error. For example, a blue LED can be used to indicate a bit-error whereas a yellow LED can signal an obscuration error. In some embodiments, controller 320 can provide additional information for debugging purpose such as by outputting the received bit pattern and the expected bit pattern.

Figure 4:
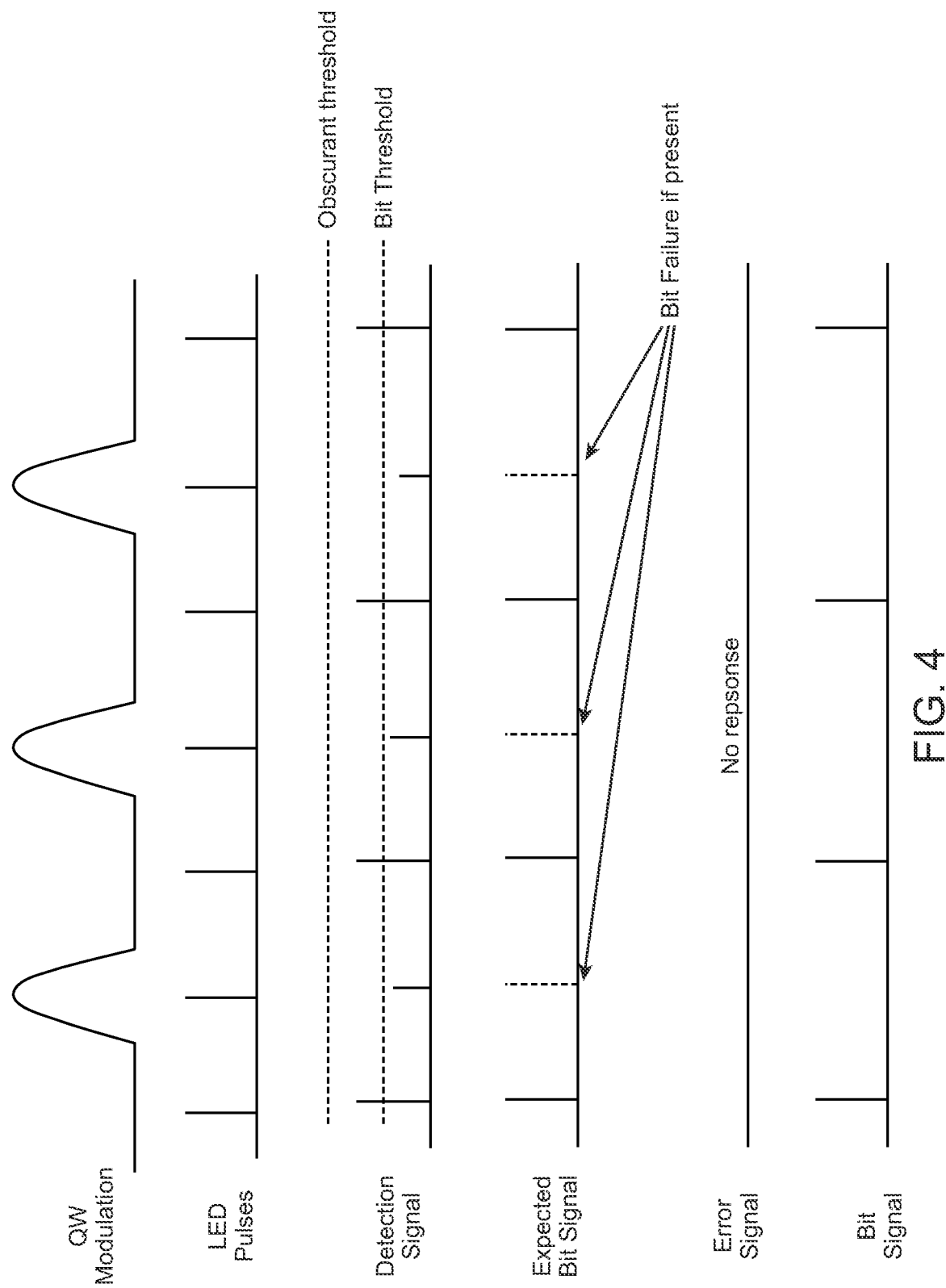
FIG. 4 is a signal diagram showing exemplary signaling such as can be used with the field test circuit of FIG. 3.

FIG. 4 is a diagram showing exemplary signaling such as can be used with field test circuit 300. As illustrated, QW modulation pulses are generated at approximately ½ the frequency of LED pulses as part of a self-test procedure. For example, QWM driver 340 can drive quantum well modulator 190 and LED driver 330 can drive radiation sources 230 according to sequences generated by controller 320. A detection signal such as may be generated by optical receiver 160 is shown in relation to the obscurant threshold 390 and the bit threshold 370.

The expected bit signal indicates when a bit should be detected based on the LED pulses and the QW modulation. A bit is detected when the detection signal exceeds the bit threshold. When the quantum well modulator is pulsed, it is expected that the level of the detection signal will not exceed the bit threshold. This is indicated by the dashed vertical lines shown in the expected bit signal. The error signal reflects differences between the expected bit signal and the detection signal. Lastly, the bit signal indicates when a bit is detected.

Controller 320 can detect a bit error based on the relationship between the QW modulation pattern and the LED pulse pattern. As illustrated, a QW modulation pulse corresponds to every other LED pulse. If a bit is detected out of sequence, controller 320 can signal a bit error. A bit error can also arise when an expected bit is not detected. Similarly, controller 320 can detect an obscuration error when the level of the detection signal exceeds the obscuration threshold. In some embodiments, two or more error signals are provided to signify bit error and obscuration error conditions. Controller 320 can be configured to update user interface 310 based on the error signals to indicate the functioning of the optical transceiver. FIG. 4 shows a condition in which neither bit errors nor obscurant errors are detected.

Figure 5:
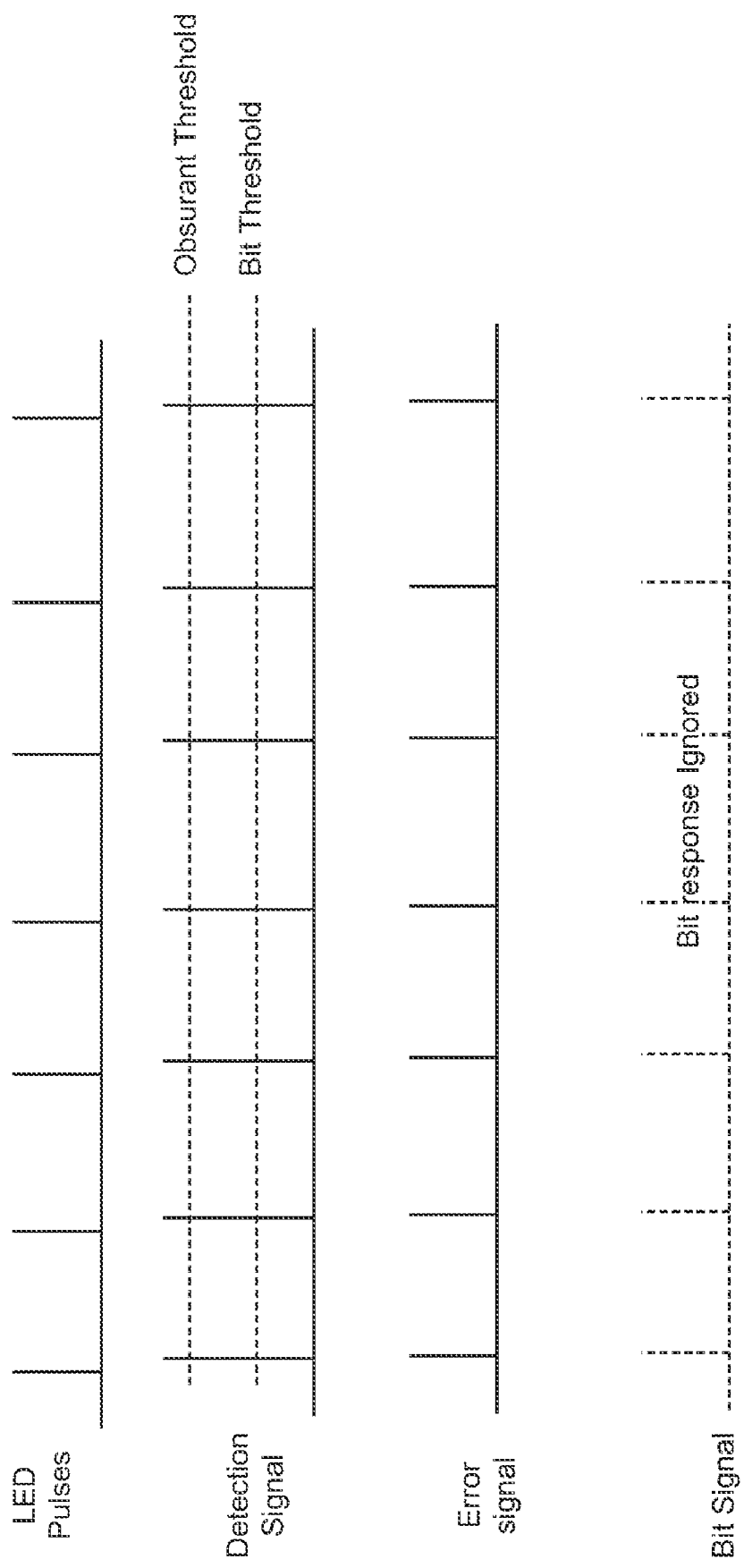
FIG. 5 shows aspects of the exemplary signals relating to the detection of an obscurant-error condition.

FIG. 5 shows aspects of the exemplary signals relating to the detection of an obscurant-error condition. In this example, LED pulses are generated at regular intervals and passed directly into the optical chamber by quantum well modulator 190. The LED pulses are reflected by an obscurant such as mud 240 producing relatively high levels of radiation at the optical receiver. As a result, the detection signal exceeds the obscuration threshold for each pulse. The error signal indicates the obscuration error condition. Due to the obscuration error, controller 320 ignores the bit response signal.

Figure 6:
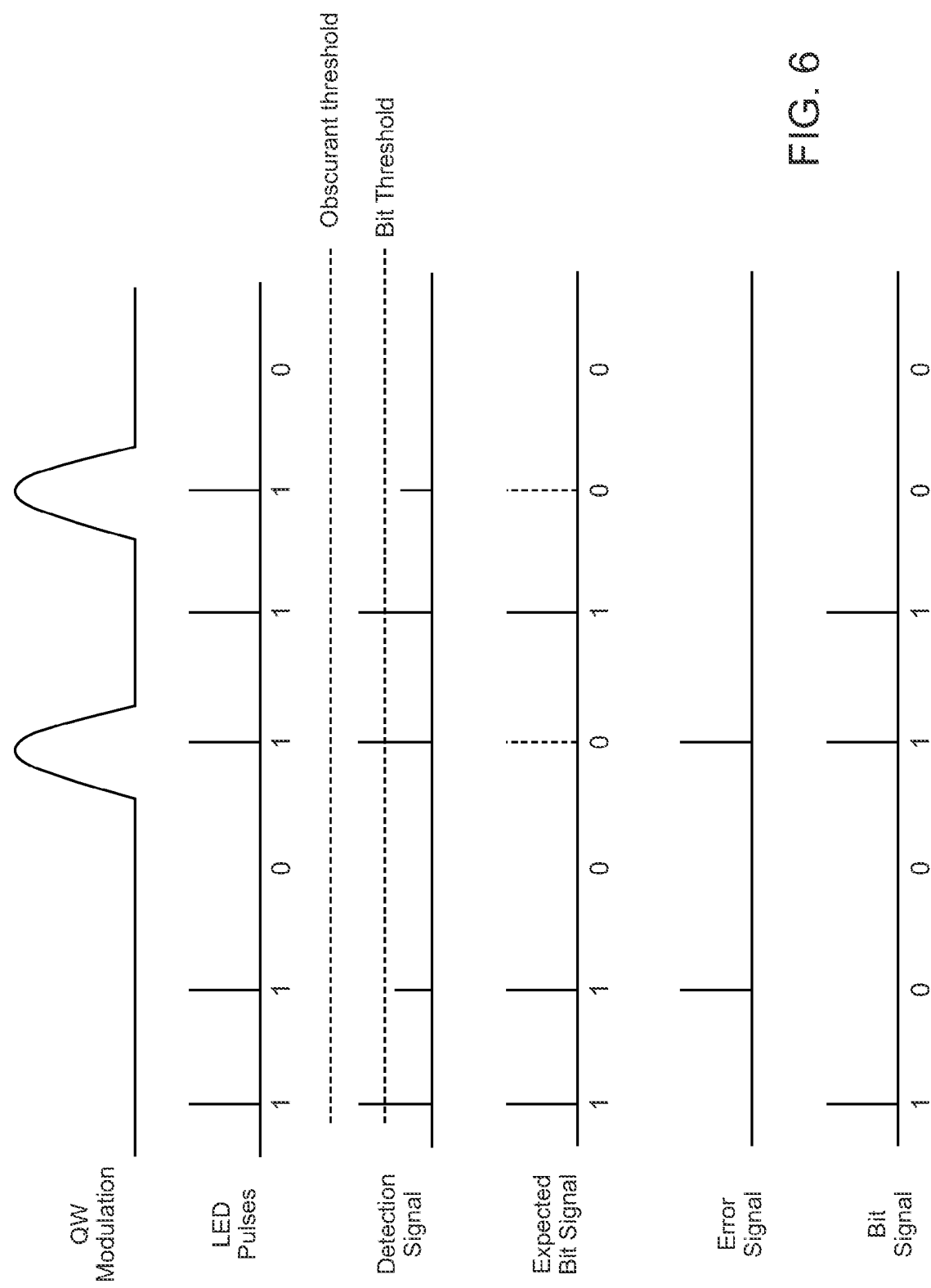
FIG. 6 shows aspects of the exemplary signals relating to the detection of a bit error condition.

FIG. 6 shows aspects of the exemplary signals relating to the detection of a bit error condition. In this example, controller 320 simulates retro-modulation of an incoming communication signal by generating a pattern of LED pulses and QW modulation having features similar to messages exchanged in a combat identification system. For example, controller 320 may first simulate a transmit code of the day (TCOD) by generating an appropriate sequence of LED pulses and then simulate a retro-modulated response with the QW modulation pulses.

As illustrated, a sequence of LED pulses representing the bit pattern 1101110 is generated. QW modulation pulses are time-aligned to coincide with the fourth and sixth bits in the LED pulse sequence so that the retro-modulated bit signal is expected to be 1100100. However, the expected bit corresponding to the second position in the LED pulse sequence is not detected. This results in the first bit error (missing bit). A bit error is also detected in relation to the fourth position in the LED pulse sequence. This pulse is QW modulated so that no bit is expected at the detector. The detected bit therefore represents a second bit error (extra bit). Accordingly, the received bit signal 1001100 does not match the expected bit signal 1100100 indicating a bit error condition.

Figure 7:
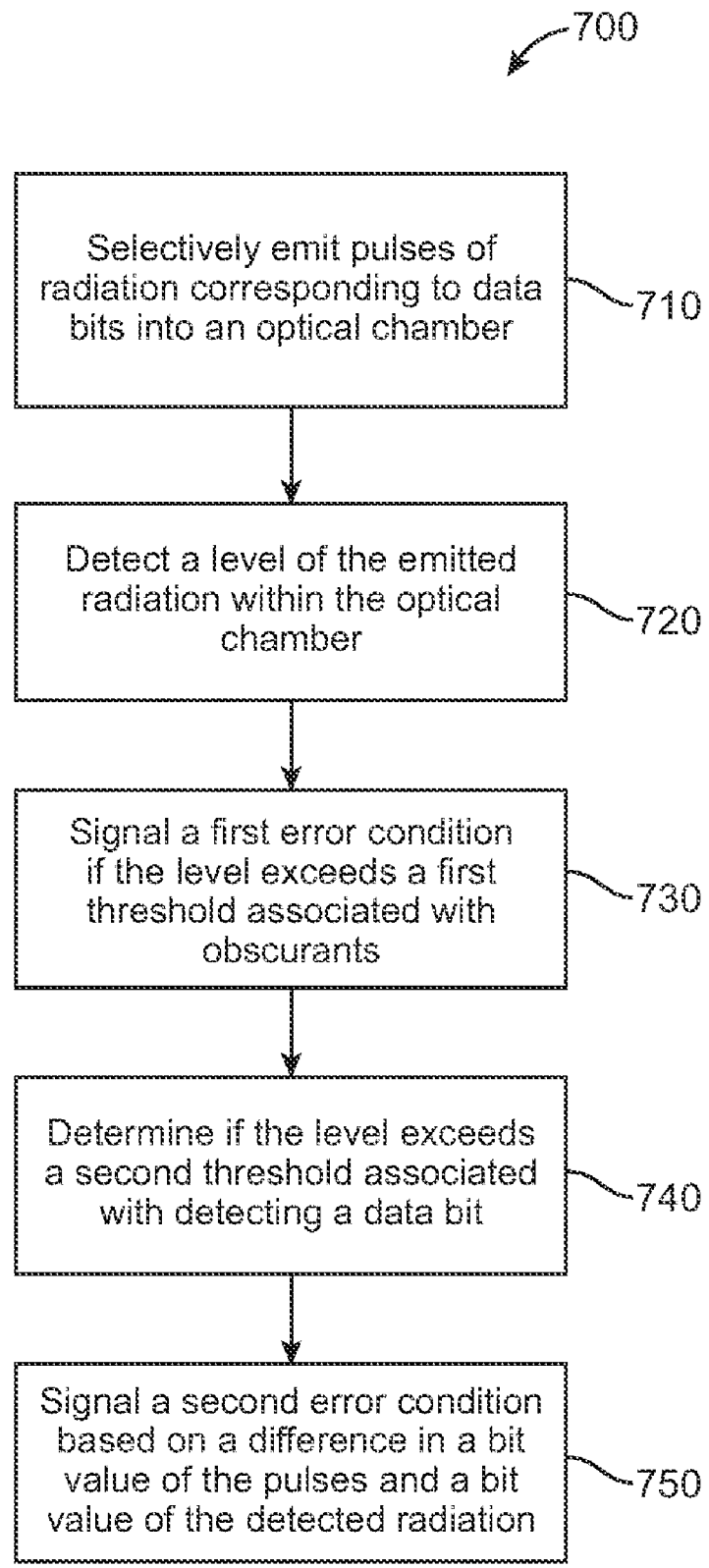
FIG. 7 is a flowchart illustrating a method of testing an opto-electronic assembly according to one embodiment of the present invention The features, objects, and advantages of embodiments of the disclosure will become more apparent from the detailed description set forth below when taken in conjunction with the drawings, in which like elements bear like reference numerals.

FIG. 7 is a flowchart illustrating a method 700 of testing an opto-electronic assembly according to one embodiment of the present invention. The steps of method 700 can be performed by controller and related components of a field test circuit such as field test circuit 300. At block 710, pulses of radiation are selectively emitted into an optical chamber of an opto-electronic assembly. The pulses can correspond to data bits and can be generated in a predetermined sequence representing a data message. In one embodiment, the pulses are passed through a retro-reflector assembly before entering the optical chamber.

At block 720, a level of the emitted radiation is detected within the optical chamber. The emitted radiation can be detected by one or more photodiodes disposed in relation to a window of the optical chamber. In some embodiments, the pulses of radiation include wavelengths in the infrared spectrum and the photodiodes are configured to detect an intensity of the radiation at the infrared wavelengths. Based on a level of the emitted radiation, one or more error conditions can be detected.

A first error condition can be signaled, block 730, when the level of radiation exceeds a first threshold associated with obscurants. The first threshold can be a predetermined value such as a measured value corresponding to a level of radiation reflected into the optical chamber when its window is occluded. Alternatively, the first threshold can be calculated based on an intensity of the emitted radiation and other factors such as the depth of modulation of an incoming optical signal which can be achieved by the opto-electronic assembly. Various audible and/or visual cues can be used to signal the first error condition. For example, one or more color-coded light emitting diodes can be used.

At block 740, it is determined if the level of the radiation exceeds a second threshold value associated with detecting a data bit. A bit threshold can be established such that a data bit is detected when a level of the radiation exceeds the bit threshold. In some embodiments, the first and second thresholds correspond to different intensity levels of the radiation and the second threshold represents a lower intensity than the first threshold. For example, measured values of radiation reflected by an obscurant may be 8-10 dB higher than the intensity without the obscurant. The first and second thresholds can reflect this difference.

A second error condition can be detected based on a difference in a bit value of the pulses and a bit value of the detected radiation. The pulses can be generated according to a predetermined sequence of data bits. If the detected data bits differ from the predetermined bit sequence, an error is indicated. For example, a bit error can be signaled when radiation from a pulse corresponding to a bit value of '1' is detected as being '0' or vice versa. Also, one or more of the emitted pulses can be modulated and a bit error can be detected based on the modulated data sequence. For example, in one test, a series of pulses representing a TCOD value can be generated for testing. In another test, retro-modulation of the test pattern with a known response code can be simulated. In this way, an end-to-end test of the opto-electronic assembly can be performed.

Specific details are given in the above description to provide a thorough understanding of the embodiments. However, it is understood that the embodiments may be practiced without these specific details. For example, circuits may be shown in block diagrams to avoid unnecessary detail. In other instances, well-known circuits, processes, algorithms, structures, and techniques may be shown without unnecessary detail to avoid obscuring the embodiments.

While the principles of the disclosure have been described above in connection with the specific apparatuses and methods, it is to be clearly understood that this description is made only by way of example and not as a limitation on the scope of the disclosure.

What is claimed is:

1. An opto-electronic assembly, comprising:
   a housing comprising an optical chamber;
   a window coupled to the housing for passing radiation between an inside of the housing and an outside of the housing;
   a retro-reflector coupled to housing;
   a radiation source coupled to the retro-reflector and arranged to emit radiation into the optical chamber;
   a detector configured to sense a level of the emitted radiation within the optical chamber; and
   a controller coupled to the detector and configured to determine a first error condition when the level of the emitted radiation exceeds a first threshold;
   wherein the radiation source is configured to emit radiation into the optical chamber through at least a part of the retro-reflector.

2. The opto-electronic assembly of claim 1 wherein the first threshold is associated with the presence of obscurants on the window.

3. The opto-electronic assembly of claim 1 wherein the controller is coupled to the radiation source and configured to generate pulses of the emitted radiation corresponding to a predetermined sequence of data bits.

4. The opto-electronic assembly of claim 3 wherein the controller is configured to perform an on-off keying of the radiation source.

5. The opto-electronic assembly of claim 3 wherein the predetermined sequence of data bits comprises a challenge sequence for testing with a combat identification system.

6. The opto-electronic assembly of claim 3 wherein the controller is configured to detect a data bit when the level of the emitted radiation exceeds a second threshold.

7. The opto-electronic assembly of claim 5 wherein the first threshold and the second threshold correspond to intensities of the emitted radiation.

8. The opto-electronic assembly of claim 7 wherein the first threshold represents an intensity at least 5 dB higher than the second threshold.

9. The opto-electronic assembly of claim 6 wherein the controller is configured to detect a second error condition based on a difference between the detected data bits and the predetermined sequence of data bits.

10. The opto-electronic assembly of claim 9 further comprising a quantum well modulator coupled to the controller and disposed within the housing between the radiation source and the window.

11. The opto-electronic assembly of claim 10 wherein the controller is configured to modulate the emitted radiation by changing an optical property of the quantum well modulator in accordance with a modulation sequence.

12. The opto-electronic assembly of claim 10 wherein the controller is configured to detect the second error condition based on a difference between the detected data bits and the modulated radiation.

13. The opto-electronic assembly of claim 9 further comprising a status indicator coupled to the controller, wherein the status indicator is configured to signal the first error condition and the second error condition.

14. A method of testing an opto-electronic assembly comprising:
   emitting radiation through at least part of a retro-reflector;
   sensing the radiation with a detector; and
   determining if a window coupled to the radiation is at least partly occluded based on a level of the radiation at the detector.

15. The method of claim 14, further comprising signaling an error if it is determined that the window is at least partly occluded.

16. The method of claim 14, further comprising:
   determining if the detector can properly recognize the radiation; and
   signaling an error if it is determined that the radiation is not properly recognized.

17. The method of claim 16, wherein emitting the radiation comprises generating pulses of radiation according to a predetermined sequence of data bits.

18. The method of claim 17 further comprising detecting a sequence of bits at the detector corresponding to the predetermined sequence, wherein a bit is detected when a level of the radiation at the detector exceeds a first threshold value.

19. The method of claim 18 wherein determining if the detector can properly recognize the radiation comprises comparing the detected bits with the predetermined sequence of data bits.

20. The method of claim 14 further comprising:
   determining that the window is at least partly occluded if the level of the radiation exceeds a second threshold value.

21. The method of claim 16 further comprising modulating a level of the radiation with a quantum well modulator to produce a modulated sequence of data bits based on the predetermined sequence.

22. The method of claim 21 wherein determining if the detector can properly recognize the radiation comprises comparing the detected bits with the modulated sequence of data bits.

23. An opto-electronic assembly comprising:
a housing comprising an optical cavity;
a window coupled to the housing;
a substrate disposed within the housing opposite to the window;
a retro-reflector coupled to the substrate and having one or more radiation sources for emitting radiation through at least part of the retro-reflector;
a quantum well modulator coupled to the retro-reflector and configured to modulate the emitted radiation according to a predetermined sequence, wherein a portion of the emitted radiation is dispersed within the optical cavity;
at least one detector coupled to the substrate for detecting the radiation dispersed within the optical cavity; and
a processor coupled to the at least one detector and configured to determine an occlusion of the window based on a level of the detected radiation.

24. The opto-electronic assembly of claim 23 wherein the processor is configured to detect a bit if the level of the detected radiation exceeds a first threshold value and to detect a bit error based on the detected bits and the predetermined sequence.

25. The opto-electronic assembly of claim 24 wherein the processor determines an occlusion of the window when the level of the detected radiation exceeds a second threshold value higher than the first threshold value.

26. The opto-electronic assembly of claim 25 wherein the first and second threshold values correspond to an intensity of the detected radiation, and wherein the second threshold value corresponds to an intensity that is approximately 8 dB higher than the first threshold value.

27. The opto-electronic assembly of claim 24 further comprising a status indicator configured to signal when a bit error is detected and to when the window is occluded.

* * * * *